US008827417B2

(12) United States Patent
Roberts et al.

(10) Patent No.: US 8,827,417 B2
(45) Date of Patent: Sep. 9, 2014

(54) INKJET INK WITH POLYURETHANE ADDITIVE DERIVED FROM ALKOXY AROMATIC DIOLS INKS

(75) Inventors: C Chad Roberts, Hockessin, DE (US); Patrick F McIntyre, West Chester, PA (US); Waifong Liew Anton, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/816,967

(22) PCT Filed: Sep. 1, 2011

(86) PCT No.: PCT/US2011/050137
§ 371 (c)(1),
(2), (4) Date: Feb. 14, 2013

(87) PCT Pub. No.: WO2012/031071
PCT Pub. Date: Mar. 8, 2012

(65) Prior Publication Data
US 2013/0141489 A1  Jun. 6, 2013

Related U.S. Application Data

(60) Provisional application No. 61/379,055, filed on Sep. 1, 2010.

(51) Int. Cl.
*B41J 2/015* (2006.01)
*C09D 11/00* (2014.01)
*B41J 2/01* (2006.01)

(52) U.S. Cl.
CPC ............... *B41J 2/01* (2013.01); *C09D 11/324* (2013.01); *C09D 11/326* (2013.01)
USPC .............................. 347/20; 347/100

(58) Field of Classification Search
USPC ............... 347/6, 20, 95, 100, 102; 106/31.13, 106/31.27, 31.6; 523/160, 161
See application file for complete search history.

(56) References Cited

U.S. PATENT DOCUMENTS

| 5,085,698 | A | 2/1992 | Ma et al. | |
| 5,554,739 | A | 9/1996 | Belmont | |
| 5,571,311 | A | 11/1996 | Belmont et al. | |
| 5,609,671 | A | 3/1997 | Nagasawa | |
| 5,637,638 | A | 6/1997 | Chandler et al. | 524/591 |
| 5,928,419 | A | 7/1999 | Uemura et al. | |
| 6,262,152 | B1 | 7/2001 | Fryd et al. | |
| 6,294,014 | B1 | 9/2001 | Woodworth et al. | 106/499 |
| 6,511,170 | B1 * | 1/2003 | Gallo et al. | 347/100 |
| 6,632,858 | B1 | 10/2003 | Pears et al. | |
| 6,794,425 | B1 | 9/2004 | Ellis et al. | 523/160 |
| 6,852,156 | B2 | 2/2005 | Yeh et al. | |
| 6,900,260 | B1 | 5/2005 | Mangels et al. | 524/366 |
| 7,176,248 | B2 | 2/2007 | Valentini et al. | |
| 7,348,368 | B2 | 3/2008 | Kakiuchi et al. | |
| 7,503,967 | B2 * | 3/2009 | Matsui et al. | 106/31.52 |
| 2005/0176848 | A1 | 8/2005 | Chen et al. | |
| 2006/0211815 | A1 | 9/2006 | Licht et al. | 524/591 |
| 2008/0071007 | A1 | 3/2008 | Spinelli | 523/200 |
| 2008/0145563 | A1 | 6/2008 | Heischkel et al. | 522/84 |
| 2008/0207811 | A1 | 8/2008 | Brust et al. | |

FOREIGN PATENT DOCUMENTS

EP  0146090 A2  12/1984

OTHER PUBLICATIONS

International Search Report and Written Opinion of the International Searching Authority in PCT/US11/50137, PCT counterpart of the present application, Lee W. Young, Authorized Officer, International Searching Authority/US, United States Patent and Trademark Office, Alexandria, Virginia, Jan. 17, 2012.

* cited by examiner

*Primary Examiner* — Juanita D Jackson
(74) *Attorney, Agent, or Firm* — John H. Lamming

(57) ABSTRACT

The invention provides an ink for inkjet printing, comprising colorant and certain polyurethane ink additives which is derived from alkoxy aromatic diol derived from alkoxy aromatic diols which enhances fastness of the print towards highlighter and finger smudge without compromising jetting performance and storage stability of the ink. The inks may be jetted from both thermal and piezo ink jet systems.

24 Claims, No Drawings

INKJET INK WITH POLYURETHANE ADDITIVE DERIVED FROM ALKOXY AROMATIC DIOLS INKS

CROSS-REFERENCE TO RELATED APPLICATION

This application claims priority under 35 U.S.C. §119 from U.S. Provisional Application Ser. No. 61/379,055, filed Sep. 1, 2011.

FIELD OF THE INVENTION

This invention pertains to an inkjet ink, in particular to an aqueous inkjet ink comprising colorants and selected polyurethanes ink additives which are derived from alkoxy aromatic diols and to methods of using these polyurethanes in inkjet inks.

BACKGROUND OF THE INVENTION

Polyurethanes have been described as ink additives in U.S. Pat. No. 7,176,248 and U.S. Patent No. 20050176848. In U.S. Pat. No. 7,348,368 polyurethanes are described for use as additives to inkjet ink. In US20080207811 polyurethanes are described as ink additives and the examples use polymerically dispersed pigments. However, none of these describes the combination of colorants and the polyurethanes derived from alkoxy aromatic diols.

In U.S. Pat. No. 6,632,858 polyurethanes are described that are derived from chromophoric groups that have at least one colorant having at least two functional groups selected from isocyanate and isocyanate reactive groups and considered a colored polyurethane.

While inks based on aqueous dispersions with polyurethane additives have provided improved inkjet inks for many aspects of inkjet printing, a need still exists for improved inkjet ink formulations that provide good print quality and good jettability in particular when used in a thermal inkjet printhead. It is known that thermal inkjet printhead has lower tolerance towards the addition of polymer additives on its jettability and reliability compared to piezo inkjet printhead. The present invention satisfies this need by providing compositions having improved optical density, while maintaining other aspects of the ink, dispersion stability, long nozzle life and the like.

SUMMARY OF THE INVENTION

An embodiment of the invention provides the addition of a polyurethane derived from aromatic diols with alkoxy substituents to an aqueous ink comprising a colorant to provide improved water fastness of the printed image without compromising color or jetting performance.

A further embodiment provides an aqueous inkjet ink composition comprising:
(a) a colorant;
(b) an aqueous vehicle; and
(c) a first polyurethane additive comprising an alkoxy aromatic diol, a diol substituted with an ionic group, and isocyanates wherein the alkoxy aromatic diol is $Z_1$

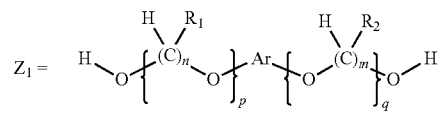

wherein Ar is an aromatic group,
n, m, p, and q are integers,
n, m are the same or different and are greater than or equal to 2 to 12,
p is greater than or equal to 1 to 15,
q is greater than or equal to 0 to 15,
$R_1$, $R_2$ are the same or different and each is independently selected from the group consisting of hydrogen, methyl, ethyl and higher alkyls of the formula of $C_tH_{2t+1}$;
where t is an integer and is greater than or equal to 3 to 36,
$Z_2$ is a diol substituted with an ionic group; and
at least one $Z_1$ and at least one $Z_2$ must be present in the first polyurethane additive.

The polyurethane which comprises an alkoxy aromatic diol is a first polyurethane additive distinct from any polymeric dispersant used for the colorant and can be described as functioning as a binder in the ink.

A further embodiment provides an aqueous inkjet ink composition comprising:
(a) a colorant;
(b) an aqueous vehicle; and
(c) a second polyurethane additive comprising an alkoxy aromatic diol, a diol substituted with an ionic group, and isocyanates wherein the alkoxy aromatic diol is $Z_1$

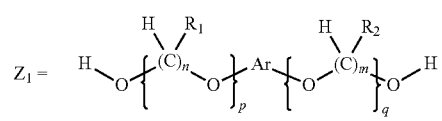

wherein Ar is an aromatic group,
n, m, p, and q are integers,
n, m are the same or different and are greater than or equal to 2 to 12,
p is greater than or equal to 1 to 15,
q is greater than or equal to 0 to 15,
$R_1$, $R_2$ are the same or different and each is independently selected from the group consisting of hydrogen, methyl, ethyl and higher alkyls of the formula of $C_tH_{2t+1}$;
where t is an integer and is greater than or equal to 3 to 36;
and wherein the second polyurethane additive has the structure II,

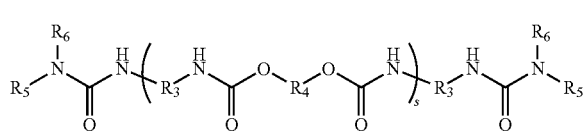

$R_3$ is alkyl, substituted alkyl, substituted alkyl/aryl from diisocyanate,
$R_4$ is $Z_1$ or $Z_2$, $R_5$ is hydrogen; alkyl; branched alkyl or substituted alkyl from the amine terminating group, $R_6$ is alkyl, branched alkyl or substituted alkyl from the amine terminating group, s is an integer greater than or equal to 2 to 30;

$Z_1$ or $Z_2$ are defined above as the alkoxy aromatic diol and $Z_2$ as the diol substituted with an ionic group.

Structure II is a polyurethane as described above as the second polyurethane additive, with the end groups limited to amine termination of the polyurethane prepolymer. The second polyurethane additive is a subset of the first polyurethane additive in that the first polyurethane can have different terminal groups.

A further embodiment wherein the inkjet ink may optionally contain other additives and adjuvants well-known to those of ordinary skill in the art.

Within yet another embodiment an aqueous pigmented inkjet ink comprising a colorant and first or second polyurethane ink additive described above, having from about 0.05 to about 10 wt % polyurethane ink additive based on the total weight of the ink, having from about 0.1 to about 10 wt % colorant based on the total weight of the ink, a surface tension in the range of about 20 dyne/cm to about 70 dyne/cm at 25° C., and a viscosity of lower than about 30 cP at 25° C.

Yet another embodiment provides the combination of colorant and the first or second polyurethane ink additives to produce inks such that when images are printed, the images have optical densities and/or durability which are improved over the colorants without these polyurethanes. These improvements enable the success of inkjet inks in making chromatic, high OD images. The selected first or second polyurethane additives produce stable inks which can be jetted from both piezo and thermal inkjet cartridges.

In another embodiment the ink sets in accordance with the present invention comprise at least three differently colored inks (such as CMY), and optionally at least four differently colored inks (such as CMYK), wherein at least one of the inks is an aqueous inkjet ink comprising:
(a) a colorant;
(b) an aqueous vehicle; and
(c) a first or second polyurethane additive derived from alkoxy aromatic diols, diols substituted with an ionic group and isocyanates as set forth above.

When a black ink is included in the CMYK ink set the black ink can be a self-dispersed black pigment.

The other inks of the ink set are preferably also aqueous inks, and may contain dyes, pigments or combinations thereof as the colorant. Such other inks are, in a general sense, well known to those of ordinary skill in the art.

In another aspect, the disclosure provides a method of inkjet printing onto a substrate is provided comprising, in any workable order, the steps of:
(a) providing an inkjet printer that is responsive to digital data signals;
(b) loading the printer with a substrate to be printed;
(c) loading the printer with an aqueous inkjet ink comprising an aqueous ink vehicle, a colorant and a first or second polyurethane additive derived from alkoxy aromatic diols, diols substituted with an ionic group, and isocyanates as described above,
(d) printing onto the substrate using the aqueous inkjet ink, in response to the digital data signals to form a printed image on the substrate.

In yet another aspect, the disclosure provides a method of inkjet printing onto a substrate is provided comprising, in any workable order, the steps of:
(a) providing an inkjet printer that is responsive to digital data signals;
(b) loading the printer with a substrate to be printed;
(c) loading the printer with an inkjet ink set where at least one of the inks in the ink set comprises an aqueous ink vehicle, a colorant and a first or second polyurethane additive derived from an alkoxy aromatic diols, diols substituted with an ionic group, and isocyanates as described above,
(d) printing onto the substrate using the aqueous inkjet ink, in response to the digital data signals to form a printed image on the substrate.

These and other features and advantages of the present invention will be more readily understood by those of ordinary skill in the art from a reading of the following Detailed Description.

Certain features of the invention which are, for clarity, described above and below as separate embodiments, may also be provided in combination in a single embodiment. Conversely, various features of the invention that are described in the context of a single embodiment may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

As used herein, "comprising" is to be interpreted as specifying the presence of the stated features, integers, steps, or components as referred to, but does not preclude the presence or addition of one or more features, integers, steps, or components, or groups thereof. Additionally, the term "comprising" is intended to include examples encompassed by the terms "consisting essentially of" and "consisting of." Similarly, the term "consisting essentially of" is intended to include examples encompassed by the term "consisting of."

When the term "about" is used in describing a value or an end-point of a range, the disclosure should be understood to include the specific value or end-point referred to.

As used herein, reference to enhanced or improved "print quality" means some aspect of optical density of the printed images and fastness (resistance to ink removal from the printed image) is increased, including, for example, rub fastness (finger rub), water fastness (water drop) and smear fastness (highlighter pen stroke).

As used herein, the term "binder" means a film forming ingredient in an inkjet ink.

As used herein, the term "Gardner color" means a visual scale and was originally developed to describe colors of commercial chemical products. A lower number Gardner scale reading indicates a lighter color.

As used herein, the term "self-dispersed pigment" means a self-dispersible" or "self-dispersing" pigments.

As used herein, the term "dispersion" means a two phase system where one phase consists of finely divided particles (often in the colloidal size range) distributed throughout a bulk substance, the particles being the dispersed or internal phase and the bulk substance the continuous or external phase.

As used herein, the term "dispersant" means a surface active agent added to a suspending medium to promote uniform and maximum separation of extremely fine solid particles often of colloidal size. For pigments the dispersants are most often polymeric dispersants and usually the dispersants and pigments are combined using dispersing equipment.

As used herein, the term "nonionic" means a substructure of a compound which has repeating —$CH_2CH$(H or R)O— groups that impart nonionic character to the compound; these groups can be incorporated into polymeric dispersants.

As used herein, the term "OD" means optical density.

As used herein, the term "CMY" means the colorants cyan, magenta and yellow; K can be As used herein, the term "aqueous vehicle" refers to water or a mixture of water and at least one water-soluble organic solvent (co-solvent).

As used herein, the term "aromatic" means a cyclic hydrocarbon containing one or more rings typified by benzene which has a 6 carbon ring containing three double bonds. Aromatic includes cyclic hydrocarbons such as naphthalene and similar multiple ring aromatic compounds.

As used herein, the term "alkyl" means a paraffinic hydrocarbon group which may be derived from an alkane and the formula is $C_nH_{2n+1}$. A substituted alkyl may have any substitution including hetero atoms substitutions such as carboxyl, amine hydroxyl.

As used herein, the term "ionizable groups" means potentially ionic groups.

As used herein, the term "AN" means acid number, mg KOH/gram of solid polymer.

As used herein, the term "neutralizing agents" means to embrace all types of agents that are useful for converting ionizable groups to the more hydrophilic ionic (salt) groups.

As used herein, the term "substantially" means being of considerable degree, almost all.

As used herein, the term "Mn" means number average molecular weight.

As used herein, the term "Mw" means weight average molecular weight.

As used herein, the term "PD" means the polydispersity which is the weight average molecular weight divided by the number average molecular weight.

As used herein, the term "d50" means the particle size at which 50% of the particles are smaller; "d95" means the particle size at which 95% of the particles are smaller.

As used herein, the term "cP" means centipoise, a viscosity unit.

As used herein, the term "prepolymer" means the polymer that is an intermediate in a polymerization process, and can be also be considered a polymer.

As used herein, the term "PUD" means the polyurethanes dispersions described herein.

As used herein, the term "DBTL" means dibutyltin dilaurate.

As used herein, the term "DMPA" means dimethylol propionic acid.

As used herein, the term "EDTA" means ethylenediaminetetraacetic acid.

As used herein, the term "HDI" means 1,6-hexamethylene diisocyanate.

As used herein, the term "GPC" means gel permeation chromatography.

As used herein, the term "IPDI" means isophorone diisocyanate.

As used herein, the term "TMDI" means trimethylhexamethylene diisocyanate.

As used herein, the term "TMXDI" means m-tetramethylene xylylene diisocyanate.

As used herein the term T650 means TERATHANE® 650.

As used herein, the term "NMP" means n-Methyl pyrrolidone.

As used herein, the term "TEA" means triethylamine.

As used herein, the term "THF" means tetrahydrofuran.

As used herein, the term "Tetraglyme" means Tetraethylene glycol dimethyl ether.

TERATHANE 650 is a 650 molecular weight, polytetramethylene ether glycol (PTMEG) commercially available from Invista, Wichita, Kans.

TERATHANE 250 is a 250 molecular weight, polytetramethylene ether glycol.

Jeffamine M-600 is a methoxyethyl terminated 600 molecular weight poly(propylene oxide/ethylene oxide) monoamine with PO/EO ratio of 9/1.

Unless otherwise noted, the above chemicals were obtained from Aldrich (Milwaukee, Wis.) or other similar suppliers of laboratory chemicals.

The materials, methods, and examples herein are illustrative only and, except as explicitly stated, are not intended to be limiting.

While seeking a balance of new performance parameters needed, ink additives were sought to not only improve the durability but also retain optical density and jettability. Polyurethanes which have as a key component an alkoxy aromatic diol were discovered that improve printed image properties and the durability of the prints. The inks with the specific polyurethane additives not only led to good print properties, but have the requisite properties to perform in all inkjet jetting systems. Normally, when polymeric additives are added to an ink to improve durability, a reduction in the jetting function and other parameters such as, the optical density are observed to degrade. Polyurethanes additives with the alkoxy aromatic diol as a key component provide inks with improved durability without loss and/or, while maintaining the optical density and jetting performance.

While not being bound by theory, it is speculated that the aromatic part of the polyurethane ink additive is especially compatible with the chemical structures of pigments and dyes which often can have aromatic groups in their chemical structures. Carbon black is an example of aromatic containing pigment for this polyurethane ink additive since the carbon black molecular structure is aromatic in nature. Quinacridones, phthalocyanines and azobenzenes are also common examples of colorants with aromatic groups in their structure. In addition to the aromatic to aromatic potential interaction, the flexibility of the alkoxy substituents may mean that the aromatic substructures from the alkoxy aromatic diol may have rotational freedom to be more compatible with the colorant and especially the pigment surfaces. Aromatic groups derived from isocyanates such as m-tetramethylene xylylene diisocyanate will have some inherent rigidity as the aromatic group is adjacent to the urethane group.

As the ink is jetted onto the substrate, often the colorant will penetrate into the substrate as the vehicle absorbs and travels into substrate. With the polyurethane derived from alkoxy aromatic diols, the colorant may be held more effectively on the substrate surface as the ink dries. The polyurethane/colorant compatibility may lead less light scatter and good optical density. The polyurethane/colorant may be particularly beneficial when the colorant is a pigment.

Colorants

Suitable colorants for the inks of the invention include soluble colorants such as dyes and insoluble colorants such as dispersed pigments (pigment plus dispersing agent) and self-dispersed pigments.

Conventional dyes such as anionic, cationic, amphoteric and non-ionic dyes are useful in this invention. Such dyes are well known to those of ordinary skill in the art. Anionic dyes are those dyes that, in aqueous solution, yield colored anions. Cationic dyes are those dyes that, in aqueous solution, yield colored cations. Typically anionic dyes contain carboxylic or sulfonic acid groups as the ionic moiety. Cationic dyes usually contain quaternary nitrogen groups.

The types of anionic dyes most useful in this invention are, for example, acid, direct, food, mordant and reactive dyes. Anionic dyes are selected from the group consisting of nitroso compounds, nitro compounds, azo compounds, stilbene compounds, triarylmethane compounds, xanthene compounds, quinoline compounds, thiazole compounds, azine compounds, oxazine compounds, thiazine compounds, aminoketone compounds, anthraquinone compounds, indigoid compounds and phthalocyanine compounds.

The types of cationic dyes that are most useful in this invention include mainly the basic dyes and some of the mordant dyes that are designed to bind acidic sites on a substrate, such as fibers. Useful types of such dyes include the azo compounds, diphenylmethane compounds, triarylmethanes, xanthene compounds, acridine compounds, quinoline compounds, methine or polymethine compounds, thiazole compounds, indamine or indophenyl compounds, azine compounds, oxazine compounds, and thiazine compounds, among others, all of which are well known to those skilled in the art.

Useful dyes include (cyan) Acid Blue 9 and Direct Blue 199; (magenta) Acid Red 52, Reactive Red 180, Acid Red 37, CI Reactive Red 23; and (yellow) Direct Yellow 86, Direct Yellow 132 and Acid Yellow 23.

Pigments suitable for used in the present invention are those generally well-known in the art for aqueous inkjet inks. Traditionally, pigments are stabilized by dispersing agents, such as polymeric dispersants or surfactants, to produce a stable dispersion of the pigment in the vehicle. Representative commercial dry pigments are listed in U.S. Pat. No. 5,085, 698. Dispersed dyes are also considered pigments as they are insoluble in the aqueous inks used herein. More recently so-called "self-dispersible" or "self-dispersed" pigments (hereafter "SDP") have been developed. As the name would imply, SDPs are dispersible in water without dispersants.

Pigments which have been stabilized by polymeric dispersants may also have these dispersants crosslinked after the pigments are dispersed. An example of this crosslinking strategy is described in U.S. Pat. No. 6,262,152.

It is generally desirable to make the stabilized pigment in a concentrated form. The stabilized pigment is first prepared by premixing the selected pigment(s) and polymeric dispersant(s) in an aqueous carrier medium (such as water and, optionally, a water-miscible solvent), and then dispersing or deflocculating the pigment. The dispersing step may be accomplished in a 2-roll mill, media mill, a horizontal mini mill, a ball mill, an attritor, or by passing the mixture through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the polymeric dispersant and the pigment under pressure. The media for the media mill is chosen from commonly available media, including zirconia, YTZ and nylon. Preferred are 2-roll mill, media mill, and by passing the mixture through a plurality of nozzles within a liquid jet interaction chamber at a liquid pressure of at least 5,000 psi.

After the milling process is complete the pigment concentrate may be "let down" into an aqueous system. "Let down" refers to the dilution of the concentrate with mixing or dispersing, the intensity of the mixing/dispersing normally being determined by trial and error using routine methodology, and often being dependent on the combination of the polymeric dispersant, solvent and pigment.

A wide variety of organic and inorganic pigments, alone or in combination, may be selected to make the ink. The term "pigment" as used herein means an insoluble colorant. The pigment particles are sufficiently small to permit free flow of the ink through the inkjet printing device, especially at the ejecting nozzles that usually have a diameter ranging from about 10 micron to about 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is typically about 0.005 micron to about 15 micron. Preferably, the pigment particle size should range from about 0.005 to about 5 micron and, most preferably, from about 0.005 to about 1 micron. The average particle size as measured by dynamic light scattering is preferably less than about 500 nm, more preferably less than about 300 nm.

The selected pigment(s) may be used in dry or wet form. For example, pigments are usually manufactured in aqueous media and the resulting pigment is obtained as water-wet presscake. In presscake form, the pigment is not agglomerated to the extent that it is in dry form. Thus, pigments in water-wet presscake form do not require as much deflocculation in the process of preparing the inks as pigments in dry form.

Self-dispersed pigments (SDPs) can be use with the polyurethane ink additives derived from alkoxy aromatic diols and are often advantageous over traditional dispersant-stabilized pigments from the standpoint of greater optical density and lower viscosity at the same pigment loading. These properties can provide greater formulation latitude in final ink.

The pigment colorants of the present invention can be self-dispersing pigments. Self-dispersed pigments are surface modified with dispersibility imparting groups to allow stable dispersion without the need for a separate dispersant. For dispersion in an aqueous vehicle, the surface modification involves addition of hydrophilic groups, more specifically, ionizable hydrophilic groups. Methods of making self-dispersed pigments are well known and can be found for example in U.S. Pat. No. 5,554,739 and U.S. Pat. No. 6,852, 156.

The self-dispersed pigment colorant can be further characterized according to its ionic character. Anionic self-dispersed pigment yields, in an aqueous medium, particles with anionic surface charge. Conversely, cationic self-dispersed pigment yields, in an aqueous medium, particles with cationic surface charge. Particle surface charge can be imparted, for example, by attaching groups with anionic or cationic moieties to the particle surface. The self-dispersed pigment of the present invention have, although not necessarily, anionic hydrophilic chemical groups.

Anionic moieties attached to the anionic self-dispersed pigment surface can be any suitable anionic moiety but are preferably compounds (A) or (B) as depicted below:

 (A)

 (B)

where Y is selected from the group consisting of conjugate acids of organic bases; alkali metal ions; "onium" ions such as ammonium, phosphonium and sulfonium ions; and substituted "onium" ions such as tetraalkylammonium, tetraalkyl phosphonium and trialkyl sulfonium ions; or any other suitable cationic counterion. Useful anionic moieties also include phosphates and phosphonates. More suitable are type A ("carboxylate") anionic moieties which are described, for example, in U.S. Pat. No. 5,571,311, U.S. Pat. No. 5,609,671 and U.S. Pat. No. 6,852,156; Alternatively, sulfonated self-dispersed pigments may be used and have been described, for example, in U.S. Pat. No. 5,571,331; U.S. Pat. No. 5,928,419; and EP146090A1.

The self-dispersed pigments used in the present invention may be prepared, for example, by grafting a functional group or a molecule containing a functional group onto the surface of the pigment, or by physical treatment (such as vacuum plasma), or by chemical treatment (for example, by oxidatively treating the pigment surface with ozone, hypochlorous acid, sulfonic acid or the like). A single type or a plurality of types of hydrophilic functional groups may be bonded to one pigment particle. The type and degree of functionalization may be properly determined by taking into consideration, for example, dispersion stability in ink, color density, and drying properties at the front end of an inkjet head.

The anionic hydrophilic chemical groups on the self-dispersed pigment can be primarily carbonyl, carboxyl, hydroxyl groups, or a combination of carboxyl, carbonyl and hydroxyl groups; more specifically, the hydrophilic functional groups on the self-dispersed pigment are directly attached and are primarily carboxyl groups, or a combination of carboxyl and hydroxyl.

Pigments having the hydrophilic functional group(s) directly attached may be produced, for example, according to methods disclosed in U.S. Pat. No. 6,852,156. Carbon black treated by the method in U.S. Pat. No. 6,852,156 has a high surface-active hydrogen content which is base neutralized to provide stable dispersions in water. The oxidant is ozone. The carbon black treated by this method is a self-dispersed carbon black pigment. This type of self-dispersed carbon black pigment is commonly used in inkjet inks.

The self-dispersed pigments of the present invention may have a degree of functionalization wherein the density of anionic groups is less than about 3.5 μmoles per square meter of pigment surface (3.5 μmol/m$^2$), and more specifically, less than about 3.0 μmol/m$^2$. Degrees of functionalization of less than about 1.8 μmol/m$^2$, and more specifically, less than about 1.5 μmol/m$^2$, are also suitable and may be useful for certain specific types of self-dispersed pigments.

Polyurethanes Ink Additives

The polyurethane ink additive is derived from alkoxy aryl diols, diols substituted with an ionic group, and isocyanates wherein the alkoxy aromatic diol is $Z_1$

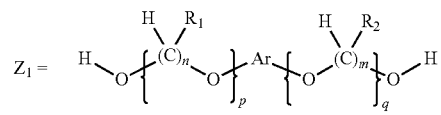

wherein Ar is an aromatic group,
n, m, p, and q are integers,
n, m are the same or different and are greater than or equal to 2 to 12,
p is greater than or equal to 1 to 15,
q is greater than or equal to 0 to 15,
$R_1$, $R_2$ are the same or different and each is independently selected from the group consisting of hydrogen, methyl, ethyl and higher alkyls of the formula of $C_tH_{2t+1}$;
where t is an integer and is greater than or equal to 3 to 36,
$Z_2$ is a diol substituted with an ionic group; and
at least one $Z_1$ and at least one $Z_2$ must be present in the first polyurethane additive composition.

The polyurethane which comprises an alkoxy aromatic diol is a first polyurethane ink additive and can be described as functioning as a binder in the ink. A second polyurethane ink additive is described below.

The first or second polyurethane ink additive derived from an alkoxy aromatic diol is either in the form of a water soluble polyurethane or an aqueous polyurethane dispersion. The polyurethane ink additive is distinct from other components added to the ink. The term "polyurethane dispersion" refers to aqueous dispersions of polymers containing urethane groups and optionally urea groups, as that term is understood by those of ordinary skill in the art. These polyurethane polymers also incorporate hydrophilic functionality to the extent required to maintain a stable dispersion of the polymer in water. The $Z_2$ diol containing the ionic group provides the ionic stabilization for the polyurethane dispersion.

The preparation of a first or second polyurethane ink additive derived from alkoxy aromatic diols comprises the steps:

(a) providing reactants comprising (i) at least one alkoxy aromatic diol $Z_1$ component comprising a diol, (ii) at least one polyisocyanate component comprising a diisocyanate, and (iii) at least one hydrophilic reactant comprising at least one isocyanate reactive ingredient containing an ionic group, $Z_2$, (b) reacting (i), (ii) and (iii) in the presence of a water-miscible organic solvent to form a polyurethane pre-polymer;

(c) adding water to form an aqueous dispersion; and (d) optionally adding a chain terminated agent before, during or after the addition of the water.

For step (a) the reactants may be added in any convenient order.

$Z_2$ contains ionizable groups and at the time of addition of water (step (c)), the ionizable groups may be ionized by adding acid or base (depending on the type of ionizable group) in an amount such that the polyurethane can be soluble or stably dispersed. This neutralization can occur at any convenient time during the preparation of the polyurethane.

At some point during the reaction (generally after addition of water and after the optional chain termination), the organic solvent is substantially removed under vacuum to produce an essentially solvent-free dispersion. Alternatively, suitable, non-volatile solvents may be used and left in the polyurethane dispersion.

The ratio of isocyanate to isocyanate reactive groups is from about 1.3:1 to about 0.9:1, and optionally from about 1.30:1 to about 1.05:1. When the moles of isocyanate group exceeds the moles of the isocyanate reactive group the isocyanate terminated polyurethane is often called a polyurethane prepolymer prior to the reaction with chain terminating agent. When the targeted percent isocyanate is reached, then the alcohol, primary amine, or secondary amine chain terminator is added, and then base or acid can be added to neutralize ionizable moieties incorporated from the ionizable reagent. When an amine is used as the terminating group the polyurethane is terminated by a urea group. The amount of urea group for these conditions is usually above 1% or more likely above 2%. The urea content of the urea-terminated polyurethane in weight percent of the polyurethane is determined by dividing the mass of amine chain terminator by the sum of the other polyurethane components including the chain terminating agent. The polyurethane solution is then converted to an aqueous polyurethane dispersion via the addition of water under high shear. If present, the volatile solvent can be distilled under reduced pressure or other means. When the isocyanate reactive groups exceed the isocyanate groups the polyurethane can be terminated in alcohol groups.

In some cases, addition of neutralization agent, especially tertiary amines, may be beneficial added during early stages of the polyurethane synthesis. Alternately, advantages may be achieved via the addition of the neutralization agent based on inorganic bases such as an alkali base, simultaneously with the water of inversion at high shear.

It should be understood that the process used to prepare the polyurethane generally results in a polyurethane polymer of the above structure being present in the final product. However, the final product will typically be a mixture of products, of which a portion is the above polyurethane polymer, the other portion being a normal distribution of other polymer products and may contain varying ratios of unreacted monomers. The heterogeneity of the resultant polymer will depend on the reactants selected as well as reactant conditions chosen.

Alkoxy Aromatic Diol Component of the Polyurethane Ink Additive

The alkoxy aromatic diol, $Z_1$, is based on aromatic compounds which have at least two oxygens substituted on the aromatic ring. When p and q are at least one each of the oxygens can be substituted with an alkyl or a substituted alkyl group including alkoxy and hydroxyl substituents. When p is at least one and q is 0, one of the oxygens is substituted with the alkyl group or a substituted group and one is bonded to a hydrogen atom. The oxygen substituents can be at any location on the aromatic ring. The aromatic group may have other alkyl substituents.

The aromatic group may be a single aromatic ring or multiple aromatic rings either single bonded such as biphenyl derivatives, or multiple bonded such as naphthalenic derivatives. The aromatic group may also have two aromatic groups which are not bonded together, but bonded through an alkyl group, or a heteroatom group. An example of an aromatic group with an alkyl group between two aromatic groups is bis-phenol compound where the alkyl group is a 2-propyl group. Examples of diols containing a hetero atom include diols derivative of benzophenone or 4,4'-sulfonyl diphenol.

Examples of an aromatic group with a single aromatic ring includes hydroquinone derivatives; two aromatic rings include naphthalene derivatives where the two oxygens can be on the same or different aromatic ring of the naphthalene; and similarly substituted anthracene and higher arenes with two oxygen substituents. Examples of aromatic groups where the aromatic groups are single bonded to one another include biphenyl with two oxygen groups either on the same aromatic group or different aromatic groups. Examples of aromatic groups with at least two aromatic groups which are not bonded to each other but through alkyl or a heteroatom group include alkoxy substituted bis phenol A, alkoxy substituted 4,4'-sulfonyl diphenol, and benzophenone diol.

The alkyl group of the alkoxy group is a $\{CH(R_1)\}_t$ where t is 2 to 12, which corresponds to the n and m in structure $Z_1$ and $R_1$ is hydrogen or alkyl. When t is 2 and $R_1$ is hydrogen the alkoxy group corresponds to an ethylene oxide derivative. When t is 2 and one of the $\{CH(R_1)\}$ groups has the $R_1$ equal to methyl, the alkoxy group is derived from a 1,2 propylene oxide. When t is greater than 3 the alkoxy group may be obtained from ring opening of the corresponding oxetane or other common synthetic pathways to alpha, omega diols. $R_1$ can be an alkyl groups with up to 22 carbons.

While these alkoxy aromatic diols may be somewhat colored, usually they are only a slight yellow color when they are dissolved in a compatible solvent. The alkoxy aromatic diols of the invention are not pigments or dyes.

For instance, POLY-G® HQEE commercially available from Arch Chemicals, Brandenburg, Ky. USA the yellowness index measured in a THF solution is limited to 50 units as calculated by the ASTM D 1925 formula using CIE Illuminant C and the CIE 1931 Standard Observer. Note HQEE is a hydroquinone derivative reacted with approximately 2 equivalents of ethylene oxide. Likewise, ethoxylated bisphenol A (Macol 202 and 209 commercially available from BASF) has a maximum color of 2 on the Gardner scale.

Diol Substituted with an Ionic Group

The diol substituted with an ionic group contains ionic and/or ionizable groups. Preferably, these reactants will contain one or two, more preferably two, isocyanate reactive groups, as well as at least one ionic or ionizable group. In the structural description of the polyurethanes with alkoxy aromatic diols described herein the reactant containing the ionic group is designated as $Z_2$.

Examples of ionic dispersing groups include carboxylate groups (—COOM), phosphate groups (—OPO$_3$M$_2$), phosphonate groups (—PO$_3$M$_2$), sulfonate groups (—SO$_3$M), quaternary ammonium groups (—NR$_3$Y, wherein Y is a monovalent anion such as chlorine or hydroxyl), or any other effective ionic group. M is a cation such as a monovalent metal ion (e.g., Na$^+$, K$^+$, Li$^+$, etc.), H$^+$, NR$_4^+$, and each R is independently an alkyl, aralkyl, aryl, or hydrogen. These ionic dispersing groups are typically located pendant from the polyurethane backbone.

The ionizable groups in general correspond to the ionic groups, except they are in the acid (such as carboxyl —COOH) or base (such as primary, secondary or tertiary amine —NH$_2$, —NRH, or —NR$_2$) form. The ionizable groups are such that they are readily converted to their ionic form during the dispersion/polymer preparation process as discussed below.

The ionic or potentially ionic groups are chemically incorporated into the polyurethanes derived from alkoxy aromatic diols in an amount to provide an ionic group content (with neutralization as needed) sufficient to render the polyurethane dispersible in the aqueous medium of the dispersion. Typical ionic group content will range from about 0.15 up to about 1.8 milliequivalents (meq), optionally, from about 0.36 to about 1.07 meq. per 1 g of polyurethane solids.

With respect to compounds which contain isocyanate reactive groups and ionic or potentially ionic groups, the isocyanate reactive groups are typically amino and hydroxyl groups. The potentially ionic groups or their corresponding ionic groups may be cationic or anionic, although the anionic groups are most often used. Examples of anionic groups include carboxylate and sulfonate groups. Examples of cationic groups include quaternary ammonium groups and sulfonium groups.

In the case of anionic group substitution, the groups can be carboxylic acid groups, carboxylate groups, sulphonic acid groups, sulphonate groups, phosphoric acid groups and phosphonate groups. The acid salts are formed by neutralizing the corresponding acid groups either prior to, during or after formation of the NCO pre-polymer, preferably after formation of the NCO pre-polymer.

Preferred carboxylic group-containing compounds are the hydroxy-carboxylic acids corresponding to the structure $(HO)_jQ(COOH)_k$ wherein Q represents a straight or branched, hydrocarbon radical containing 1 to 12 carbon atoms, j is 1 or 2, preferably 2 and k is 1 to 3, preferably 1 or 2 and more preferably 1.

Examples of these hydroxy-carboxylic acids include citric acid, tartaric acid and hydroxypivalic acid. Especially preferred acids are those of the above-mentioned structure wherein j=2 and k=1. These dihydroxy alkanoic acids are described in U.S. Pat. No. 3,412,054, Especially preferred dihydroxy alkanoic acids are the alpha,alpha-dimethylol alkanoic acids represented by the structural formula:

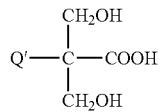

wherein Q' is hydrogen or an alkyl group containing 1 to 8 carbon atoms. The most commonly used diol compound is alpha,alpha-dimethylol propionic acid, i.e., wherein Q' is methyl in the above formula.

In order to have a stable dispersion of the polyurethane derived from alkoxy aromatic diols ink additive, a sufficient amount of the ionic groups must be neutralized so that, the resulting polyurethane will remain stably dispersed in the aqueous medium. Generally, at least about 75%, optionally at least about 90%, of the ionic groups are neutralized to the corresponding salt groups.

Suitable neutralizing agents for converting the acid groups to salt groups before, during, or after their incorporation into the NCO pre-polymers, include tertiary amines, alkali metal cations and ammonia. Preferred trialkyl substituted tertiary amines, such as triethyl amine, tripropyl amine, dimethylcyclohexyl amine, and dimethylethyl amine.

Neutralization may take place at any point in the polyurethane synthesis. A typical procedure includes at least some neutralization of the pre-polymer.

When the ionic stabilizing groups are acids, the acid groups are incorporated in an amount sufficient to provide an acid group content for the urea-terminated polyurethane, known by those skilled in the art as acid number {AN} (mg KOH per gram solid polymer), at least about 8 milligrams KOH per 1.0 gram of polyurethane and optionally 20 milligrams KOH per 1.0 gram of polyurethane. The upper limit for the acid number (AN) is about 100 and optionally about 60.

The polyurethanes ink additive derived from alkoxy aromatic diols has a number average molecular weight of about 2000 to about 30,000. Optionally, the molecular weight is about 3000 to 20000.

The polyurethane ink additive is a generally stable aqueous dispersion of polyurethane particles having a solids content of up to about 60% by weight, specifically, about 15 to about 60% by weight and most specifically, about 20 to about 45% by weight. However, it is always possible to dilute the dispersions to any minimum solids content desired.

Other Isocyanate-Reactive Components

The polyurethane ink additive derived from alkoxy aromatic diols above may be blended with other polyfunctional isocyanate-reactive components during the polyurethane synthesis, most notably oligomeric and/or polymeric polyols. These other polyfunctional are limited to no more than 30 weight percent of the alkoxy aromatic diol component, $Z_1$. These other isocyanate reactive components are chosen for their stability to hydrolysis Suitable other diols contain at least two hydroxyl groups, and have a molecular weight of from about 60 to about 6000. Of these, the polymeric diols are best defined by the number average molecular weight, and can range from about 200 to about 6000, specifically, from about 400 to about 3000, and more specifically from about 600 to about 2500. The molecular weights can be determined by hydroxyl group analysis (OH number).

Examples of polymeric polyols include polyesters, polyethers, polycarbonates, polyacetals, poly(meth)acrylates, polyester amides, and polythioethers. A combination of these polymers can also be used. For examples, a polyether polyol and a poly (meth)acrylate polyol may be used in the same polyurethane synthesis. In the case of using a polyether polyol, both ionic (from $Z_2$) and nonionic stabilization (from the polyether polyol) can contribute to the stabilization of the polyurethane ink additive.

The polycarboxylic acids may be aliphatic, cycloaliphatic, aromatic and/or heterocyclic or mixtures thereof and they may be substituted, for example, by halogen atoms, and/or unsaturated.

In addition to the above-mentioned components, which are difunctional in the isocyanate polyaddition reaction, monofunctional and even small portions of trifunctional and higher functional components generally known in polyurethane chemistry, such as trimethylolpropane or 4-isocyanantomethyl-1,8-octamethylene diisocyanate, may be used in cases in which branching of the NCO pre-polymer or polyurethane is desired.

It is, however, preferred that the NCO-functional prepolymers should be substantially linear, and this may be achieved by maintaining the average functionality of the pre-polymer starting components at or below 2:1.

Isocyanate Component

Suitable polyisocyanates are those that contain either aromatic, cycloaliphatic or aliphatic groups bound to the isocyanate groups. Mixtures of these compounds may also be used. Preferred are compounds with isocyanates bound to a cycloaliphatic or aliphatic moieties. If aromatic isocyanates are used, cycloaliphatic or aliphatic isocyanates are preferably present as well.

Diisocyanates are preferred, and any diisocyanate useful in preparing polyurethanes and/or polyurethane-ureas from polyether glycols, diisocyanates and diols or amine can be used in this invention.

Examples of suitable diisocyanates include, but are not limited to, 2,4-toluene diisocyanate (TDI); 2,6-toluene diisocyanate; trimethyl hexamethylene diisocyanate (TMDI); 4,4'-diphenylmethane diisocyanate (MDI); 4,4'-dicyclohexylmethane diisocyanate ($H_{12}$MDI); 3,3'-dimethyl-4,4'-biphenyl diisocyanate (TODD; Dodecane diisocyanate ($C_{12}$DI); m-tetramethylene xylylene diisocyanate (TMXDI); 1,4-benzene diisocyanate; trans-cyclohexane-1,4-diisocyanate; 1,5-naphthalene diisocyanate (NDI); 1,6-hexamethylene diisocyanate (HDI); 4,6-xylyene diisocyanate; isophorone diisocyanate (IPDI); and combinations thereof. IPDI and TMXDI are most suitable.

Small amounts, less than about 3 wt % based on the weight of the diisocyanate, of monoisocyanates or polyisocyanates can be used in mixture with the diisocyanate. Examples of useful monoisocyanates include alkyl isocyanates such as octadecyl isocyanate and aryl isocyanates such as phenyl isocyanate. Example of a polyisocyanate are triisocyanatotoluene, HDI trimer (Desmodur 3300), and polymeric MDI (Mondur MR and MRS).

Ratios of Polyurethane Components

For both the first and second polyurethane additives described above the ratio of isocyanate to isocyanate reactive groups is from about 1.3:1 to about 1.0:1, and suitably from about 1.25:1 to about 1.05:1. In the case where the isocyanate groups are more than the isocyanate reactive groups, often a chain termination group is used. This chain termination groups can include alcohols and amines.

The amount of chain terminator employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, suitably from about 1.0:1.1 to about 1.1:1, and suitably from about 1.0:1.05 to about 1.1:1, on an equivalent basis.

In addition to alcohols, aliphatic primary or secondary monoamines are commonly used as the chain termination agents. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl)amine, diethylamine, bis(methoxyethyl)amine, N-methylstearyl amine, diethanolamine and N-methyl aniline.

When the chain termination agent is an amine, the second polyurethane additive has the structure (II)

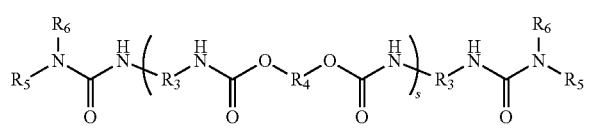

$R_3$ is alkyl, substituted alkyl, substituted alkyl/aryl from diisocyanate,
$R_4$ is $Z_1$ or $Z_2$,
$R_5$ is hydrogen; alkyl; branched alkyl or substituted alkyl from the amine terminating group,
$R_6$ is alkyl, branched alkyl or substituted alkyl from the amine terminating group,
s is an integer greater than or equal to 2 to 30;
$Z_1$ or $Z_2$ are defined above as the alkoxy aromatic diol and $Z_2$ as the diol substituted with an ionic group.

Thus, structure (II) is a polyurethane as described above as the second polyurethane additive, but the end groups are limited to amine termination of the polyurethane prepolymer. The second polyurethane additive is a subset of the first polyurethane additive in that the first polyurethane can have different terminal groups.

Any primary or secondary monoamines reactive with isocyanates may be used as chain terminators. Aliphatic primary or secondary monoamines are preferred. Example of monoamines useful as chain terminators include but are not restricted to butylamine, hexylamine, 2-ethylhexyl amine, dodecyl amine, diisopropanol amine, stearyl amine, dibutyl amine, dinonyl amine, bis(2-ethylhexyl)amine, diethylamine, bis(methoxyethyl)amine, N-methylstearyl amine and N-methyl aniline. An optional isocyanate reactive chain terminator is bis(methoxyethyl)amine. The bis(methoxyethyl)amine is part of a class of urea terminating reactant where the substituents are non reactive in the isocyanate chemistry, but have nonionic hydrophilic groups. This nonionic hydrophilic group provides the urea terminated polyether diol polyurethane with more water compatible.

The urea content in percent of the second polyurethane additive is determined by dividing the mass of chain terminator by the sum of the other polyurethane components including the chain terminating agent. The urea content will be from about 2 wt % to about 14.5 wt %. The urea content will be preferably from about 2.5 wt % to about 10.5 wt %.

It is important that this urea group be the terminating group and there are no substituents in the chain terminating group that can lead to crosslinking or bridging to another polyurethane. Thus, $R_5$ and $R_6$ are each described as not having any isocyanate reactive groups. $R_5$ may be hydrogen.

The second polyurethane additive is prepared in a manner similar to what is described for the first polyurethane additive.

Aqueous Vehicle

Selection of a suitable aqueous vehicle mixture depends on requirements of the specific application, such as desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and at least one water-miscible solvent is used, the aqueous vehicle typically will contain about 30% to about 95% water with the balance (i.e., about 70% to about 5%) being the water-soluble solvent. Compositions of the present invention may contain about 60% to about 95% water, based on the total weight of the aqueous vehicle.

The amount of aqueous vehicle in the ink is typically in the range of about 70% to about 99.8%, specifically about 80% to about 99.8%, based on total weight of the ink.

The aqueous vehicle can be made to be fast penetrating (rapid drying) by including surfactants or penetrating agents such as glycol ethers and 1,2-alkanediols. Suitable surfactants include ethoxylated acetylene diols (e.g. Surfynols® series commercially available from Air Products), ethoxylated primary (e.g. Neodol® series commercially available from Shell) and secondary (e.g. Tergitol® series commercially available from Union Carbide) alcohols, sulfosuccinates (e.g. Aerosol® series commercially available from Cytec), organosilicones (e.g. Silwet® series commercially available from Witco) and fluoro surfactants (e.g. Zonyl® series commercially available from DuPont).

The amount of glycol ether(s) and 1,2-alkanediol(s) added must be properly determined, but is typically in the range of from about 1 to about 15% by weight and more typically about 2 to about 10% by weight, based on the total weight of the ink. Surfactants may be used, typically in the amount of about 0.01 to about 5% and preferably about 0.2 to about 2%, based on the total weight of the ink.

Other Ingredients

Other ingredients may be formulated into the inkjet ink, to the extent that such other ingredients do not interfere with the stability and jettability of the ink, which may be readily determined by routine experimentation. Such other ingredients are in a general sense well known in the art.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Proportion of Main Ingredients

The colorant levels employed in the instant inks are those levels which are typically needed to impart the desired color density to the printed image. Typically, colorant levels are in the range of about 0.05 to about 10% by weight of the ink. The polyurethane ink additive which is derived from alkoxy aromatic diols is added as a distinct additive to the ink at the time the ink is formulated. The various ink components including the polyurethane ink additive which is derived from alkoxy aromatic diol can be added together in any convenient order. When the colorant is a pigment there are two dispersions in the ink—the pigment dispersion and the polyurethane dispersion.

The amount of polyurethane ink additive which is derived from alkoxy aromatic diols used in the inks is dictated by the degree of fixation sought and the range of ink properties which may be tolerated. Typically, polyurethane ink additive levels will range up to about 10 weight %, suitably from about 0.1 to about 8%, more suitably about 0.2 to about 6% by weight of total ink composition. The polyurethane ink additive which is derived from alkoxy aromatic diols provides some degree of improved ink fixation onto the substrate. Better fixation is obtained at higher levels, but generally, at some point, viscosity is increased excessively and jetting performance becomes unacceptable. The right balance of properties must be determined for each circumstance, which determination may generally be made by routine experimentation well within the skill of those of ordinary skill in the art.

Ink Properties

Jet velocity, separation length of the droplets, drop size and stream stability are greatly affected by the surface tension and the viscosity of the ink. Pigmented inkjet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element, or ejection conditions for a thermal head, for either a drop-on-demand device or a continuous device, and the shape and size of the nozzle. The inks should have excellent storage stability for long periods so as not to clog to a significant extent in an inkjet apparatus. Further, the ink should not corrode parts of the inkjet printing device it comes in contact with, and it should be essentially odorless and non-toxic.

Although not restricted to any particular viscosity range or printhead, the inventive ink set is particularly suited to lower viscosity applications such as those required by thermal printheads. Thus, the viscosity (at 25° C.) of the inventive inks can be less than about 7 cP, is optionally less than about 5 cP, and most advantageously is less than about 3.5 cP. Thermal inkjet actuators rely on instantaneous heating/bubble formation to eject ink drops and this mechanism of drop formation generally requires inks of lower viscosity.

Substrate

The instant invention is particularly advantageous for printing on plain paper, such as common electrophotographic copier paper and photo paper, glossy paper and similar papers used in inkjet printers. Textiles can also be used with these inks.

EXAMPLES

Extent of Polyurethane Reaction

The extent of polyurethane reaction was determined by detecting NCO % by dibutylamine titration, a common method in urethane chemistry. In this method, a sample of the NCO containing pre-polymer is reacted with a known amount of dibutylamine solution and the residual amine is back titrated with HCl. The difference in dibutylamine loading and amount titrated is the equivalents of NCO, and this value is converted to weight % NCO.

Particle Size Measurements

The particle size for the polyurethane dispersions, pigments and the inks were determined by dynamic light scattering using a MICROTRAC UPA 150 analyzer from Honeywell/Microtrac (Montgomeryville, Pa.).

This technique is based on the relationship between the velocity distribution of the particles and the particle size. Laser generated light is scattered from each particle and is Doppler shifted by the particle Brownian motion. The frequency difference between the shifted light and the unshifted light is amplified, digitalized and analyzed to recover the particle size distribution.

Solid Content Measurement

Solid content for the solvent free polyurethane dispersions was measured with a moisture analyzer, model MA50 from Sartorius. For polyurethane dispersions containing high boiling solvent, such as NMP, tetraethylene glycol dimethyl ether, the solid content was then determined by the weight differences before and after baking in 150° C. oven for 180 minutes. Other solvents used were Proglyde DMM from Dow Chemical (dipropylene glycol dimethyl ether) and sulfolane.

MW Characterization of the Polyurethane Additive

All molecular weights were determined by GPC using poly (methyl methacrylate) standards with tetrahydrofuran as the eluent. Using statics derived by Flory, the molecular weight of the polyurethane may be calculated or predicted based on the NCO/OH ratio and the molecular weight of the monomers. Molecular weight is also a characteristic of the polyurethane that can be used to define a polyurethane. The molecular weight is routinely reported as number average molecular weight, Mn. The polyurethane additives are not limited to Gaussian distribution of molecular weight, but may have other distributions such as bimodal distributions.

Polyurethane Ink Additive Example 1 IPDI/HQEE BMEA 45 AN

A 2 L reactor was loaded with 73.9 g Poly-G HQEE (OH #555, commercially available from Arch Chemical), 99.5 g sulfolane, and 27.0 g dimethylol propionic acid. The reaction was heated to 72° C. Over the course of 60 minutes 139.3 g isophorone diisocyanate was added to the reactor followed by 11.5 g sulfolane while the reaction temperature held at 80° C. reaching a maximum of 83.6° C. When the % NCO was below 1.9%, 15.20 g bis(2-methoxy ethyl)amine was added over the course of 5 minutes. The reaction was held at 80° C. for 1 hr. To adjust the viscosity, 51 g sulfolane was added, and the temperature was increased to 90° C. The polyurethane solution was inverted under high speed mixing by adding a mixture of 45% KOH (22.5 g) and 324.2 g water followed by an additional 287.8 g water. The polyurethane dispersion had a viscosity of 41.2 cPs, 26.27% solids, and pH 7.51, particle size of d50=9.4 nm and d95=16.2 nm. This polyurethane had a calculated 5.95% urea content.

Polyurethane Ink Additive Example 2 IPDI/HQEE BMEA 60 AN

A 2 L reactor was loaded 2 L with 66.8 g Poly-G HQEE (OH #555, commercially available from Arch Chemical), 157.3 g sulfolane, and 39.5 g dimethylol propionic acid. The reaction was heated to 69° C. Over the course of 60 minutes 153.85 g isophorone diisocyanate was added to the reactor followed by 13.4 g sulfolane while the reaction temperature held at 80° C. reaching a maximum of 83.9° C. After 2.5 hr, the % NCO was below 1.6%, 16.8 g bis(2-methoxy ethyl) amine was added over the course of 10 minutes. The reaction was held at 80° C. for 1 hr. The polyurethane solution was inverted under high speed mixing by adding a mixture of 45% KOH (33.1 g) and 467.5 g water followed by an additional 159.4 g water. The polyurethane dispersion had a 27.56% solids, pH 7.53, and molecular weight by GPC of Mn 6655 with a polydispersity of 1.96. This polyurethane had a calculated 6.08% urea content.

Polyurethane Ink Additive Example 3 IPDI/HQEE BMEA 30% DMPA

A 2 L reactor was loaded with 137.4 g Poly-G HQEE (OH #555, commercially available from Arch Chemical), 199.9 g tetraethylene glycol dimethyl ether, and 49.7 g dimethylol propionic acid. The reaction was heated to 75° C., and then, 0.21 g dibutyl tin dilaurate was added. Over the course of 60 minutes 194.3 g isophorone diisocyanate was added followed by 25.2 g tetraethylene glycol dimethyl ether while the reaction temperature held at 85° C. reaching a maximum of 91.2° C. After 2.5 hr, the % NCO was below 3.6%, then 70.5 g bis(2-methoxy ethyl)amine was added over the course of 10 minutes. The reaction was held at 80° C. for 1 hr. The polyurethane solution was inverted under high speed mixing by adding a mixture of 45% KOH (41.6 g) and 583.4 g water followed by an additional 602.4 g water. The polyurethane dispersion had a viscosity of 61.6 cPs, 28.04% solids, pH 8.1, and molecular weight by GPC of Mn 4443 with a polydispersity of 1.68, and particle size of d50=12.4 nm and d95=22 nm. This polyurethane had a calculated 15.6% urea content.

Polyurethane Ink Additive Example 4 IPDI/HQEE EDA 50% DMPA

A 2 L reactor was loaded with 105.4 g Poly-G HQEE (OH #555, commercially available from Arch Chemical), 116.5 g tetraethylene glycol dimethyl ether, and 0.5 g dibutyl tin dilaurate. The reaction was heated to 75° C., and then, over the course of 60 minutes 293.5 g isophorone diisocyanate was added followed by 48.3 g tetraethylene glycol dimethyl ether while the reaction temperature held at 80° C. After 3 hr, the % NCO was 12.1%, and 70.9 g dimethylol propionic acid was added along with 47.2 g tetraethylene glycol dimethyl ether. After 4 hr, the % NCO was less than 1%. The polyurethane solution was inverted under high speed mixing by adding a mixture of 45% KOH (59.3 g) and 831.2 g water followed by 13.3 g ethylene diamine in 417.6 g water. The polyurethane dispersion had a viscosity of 20.2 cPs, 21.23% solids, pH 8.92, and molecular weight by GPC of Mn 14315 with a polydispersity of 2.22, and particle size of d50=8.85 nm and d95=22.3 nm. This polyurethane had a calculated 2.75% urea content.

Polyurethane Ink Additive Example 5 IPDI/HQEE BMEA 50% DMPA

A 2 L reactor was loaded with 116.5 g Poly-G HQEE (OH #555, commercially available from Arch Chemical), 208.7 g tetraethylene glycol dimethyl ether, and 78.3 g dimethylol propionic acid. The mixture was heated to 74° C. with $N_2$ purge, then, and 0.2 g dibutyl tin dilaurate was added. Over the course of 60 minutes 275.8 g isophorone diisocyanate was added followed by 22.7 g tetraethylene glycol dimethyl ether. The reaction was held at 80° C. for 2 hrs when the % NCO was 1.2%. Then, 19.5 g bis(2-methoxy ethyl)amine was added over the course of 10 minutes and continued heating for 1 hr. The polyurethane solution was inverted under high speed mixing by adding a mixture of 45% KOH (65.5 g) and 924.6 g water followed by an additional 302.4 g water. The polyurethane dispersion had a viscosity of 26.9 cPs, 27.22% solids, pH 7.20, and particle size of d50=10.2 nm and d95=16.6 nm. and molecular weight by GPC of Mn 7691 and PD 2.06. This polyurethane had a calculated 3.98% urea content.

Polyurethane Ink Additive Example 6 IPDI/HQEE EDA 50% DMPA

A 2 L reactor was loaded with 90.2 g Poly-G HQEE (OH #555, commercially available from Arch Chemical), 107.7 g Proglyde DMM, and 0.2 g dibutyl tin dilaurate. The reaction was heated to 86° C., and then, over the course of 60 minutes 164.2 g isophorone diisocyanate was added followed by 40.5 g Proglyde DMM while the reaction temperature held at 80° C. After 1 hr, the % NCO was 6.3%, and 32.7 g dimethylol propionic acid was added along with 26.2 g Proglyde DMM. After 4 hr, the % NCO was less than 1% and the reactor was cooled to 50° C. while adding 100 g Proglyde DMM. The polyurethane solution was inverted under high speed mixing by adding a mixture of 45% KOH (27.3 g) and 387.1 g water followed by 2.6 g ethylene diamine in 334.5 g water. The polyurethane dispersion had a viscosity of 107.8 cPs, 22.43% solids, pH 8.82, and molecular weight by GPC of Mn 27235 with a polydispersity of 1.79, and particle size of d50=22.1 nm and d95=37.2 nm. This polyurethane had a calculated 0.90% urea content.

Polyurethane Ink Additive Example 7 PU with Macol (Bisphenol a Ethoxylate) IPDI/BisA9EO BMEA 53AN A 2 L reactor was loaded with 178.5 g Macol RD 209 E (619 MW Bisphenol A ethoxylate from BASF), 182.2 g sulfolane, and 40.3 g dimethylol propionic acid. The reaction was heated to 115° C. for 1 hr then cooled to 71° C. and added 0.23 g dibutyl tin dilaurate. Over the course of 60 minutes 141.0 g isophorone diisocyanate was added followed by 28.2 g sulfolane while the reaction temperature held at 81° C. After 200 min, the % NCO was 1.1%, and 32.7 g acid was added along with 26.2 g sulfolane. After 4 hr, the % NCO was less than 1%, and then, 12.1 g bis(2-methoxy ethyl)amine was added over the course of 10 minutes. The reaction was held at 80° C. for 1 hr. The polyurethane solution was inverted under high speed mixing by adding a mixture of 45% KOH (33.7 g) and 472.3 g water followed by an additional 413.2 g water and 1 g Proxel GXL. The polyurethane dispersion had a pH 7.86, 24.5% solids, and molecular weight by GPC of 7403 with a polydispersity of 2.5, and a surface tension of 46.62 dynes/cm. This polyurethane had a calculated 3.25% urea content.

Polyurethane Ink Additive Example 8 with Bis[4-(2-Hydroxyethoxy)Phenyl] Sulfone A 2 L reactor was loaded 134.9 g Bis[4-(2-hydroxyethoxy) phenyl] sulfone (338 MW Bisphenol S bis(2-hydroxyethyl) ether from Aldrich), 202.5 g sulfolane, and 44.7 g dimethylol propionic acid. The reaction was heated to 115° C. for 1 hr then cooled to 71° C. and added 0.32 g dibutyl tin dilaurate. Over the course of 60 minutes 178.8 g isophorone diisocyanate was added followed by 34 g sulfolane while the reaction temperature held at 80° C. reaching a maximum of 92° C. Sulfolane (101 g) was added to the reaction to reduce viscosity. After 3.5 hr, the % NCO was 1.23%, and then, 19.5 g bis(2-methoxy ethyl)amine was added over the course of 10 minutes. The reaction was held at 80° C. for 1 hr. The polyurethane solution was inverted under high speed mixing by adding a mixture of 45% KOH (37.4 g) and 522.6 g water followed by an additional 327.1 g water and 3 g Proxel GXL. The polyurethane dispersion had a viscosity of 130 cPs, 27.6% solids, pH 7.54, and molecular weight by GPC of Mn 5312 with a polydispersity of 1.71, and a surface tension of 45.82 dynes/cm. This polyurethane had a calculated 5.16% urea content.

Dispersant Polymer 1 ETEGMA//BZMA//MAA 3.6//13.6//10.8

A 3-liter flask was equipped with a mechanical stirrer, thermometer, $N_2$ inlet, drying tube outlet, and addition funnels. Tetrahydrofuran THF, 291.3 gm, was charged to the flask. The catalyst tetrabutyl ammonium m-chlorobenzoate, 0.44 ml of a 1.0 M solution in acetonitrile, was then added. Initiator, 1,1-bis(trimethylsiloxy)-2-methyl propene, 20.46 gm (0.0882 moles) was injected. Feed I [tetrabutyl ammonium m-chlorobenzoate, 0.33 ml of a 1.0 M solution in acetonitrile and THF, 16.92 gm] was started and added over 185 minutes. Feed II [trimethylsilyl methacrylate, 152.00 gm (0.962 moles)] was started at 0.0 minutes and added over 45 minutes. One hundred and eighty minutes after Feed II was completed (over 99% of the monomers had reacted) Feed III [benzyl methacrylate, 211.63 gm (1.20 moles) was started and added over 30 minutes. Forty minutes after Feed III was completed (over 99% of the monomers had reacted) Feed IV [ethoxytriethyleneglycol methacrylate, 78.9 gm (0.321 moles) was started and added over 30 minutes.

At 400 minutes, 73.0 gm of methanol and 111.0 gm of 2-pyrrolidone was added to the above solution and distillation began. During the first stage of distillation, 352.0 gm of material was removed. Then more 2-pyrrolidone 340.3 gm was added and an additional 81.0 gm of material was distilled out. Finally, 2-pyrrolidone, 86.9 gm total, was added.

The polymer has a composition of ETEGMA//BZMA//MAA 3.6//13.6//10.8. It has a molecular weight of Mn=4,200, acid value 2.90.

Dispersant Polymer 2: Diblock 8ETEGMA//30BMA/11MAA

A 3-liter round bottom flask was dried with a heat gun under nitrogen purge and equipped with a mechanical stirrer, thermocouple, $N_2$ inlet, drying tube outlet, and addition funnels. Tetrahydrofuran (THF), 2423 g, was cannulated to the flask. Initiator (1,1-bis(trimethylsilyloxy)-2-methyl propene, 98.82 g (0.426 moles)) was injected followed by catalyst (tetrabutyl ammonium m-chlorobenzoate, 2.6 ml of a 1.0 M solution in acetonitrile). Catalyst solution (tetrabutyl ammonium m-chlorobenzoate, 2.1 ml of a 1.0 M solution in acetonitrile and THF, 16.1 g) was syringe pumped during both the monomer feeds. Monomer feed 1 (trimethylsilyl methacrylate 728.7 g (4.61 mol) and butyl methacrylate, 1790.9 g (12.61 mol)) was added over 60 minutes while the reaction exothermed to 65° C. After a 1 hr hold, HPLC indicated greater than 95% monomer conversion, and then, monomer feed II (ethyl triethylene glycol methacrylate, 825.3 g (3.35 mol)) was added over 15 minutes.

The ETEGMA conversion was greater than 98% 90 minutes after the feed was complete. 322.6 g of methanol were added, and then the THF and other volatile by-products were distillated by slowly heating to 120° C. while adding 2-pyrrolidone (2P). The final polymer solution was 45.1% solids with a measured number of 98.2 mg KOH/gram of polymer solids. The molecular weight of this polymer as measured by GPC was Mn 9018, Mw 9635, and PD 1.07.

Comparative Additive Polymer 1 IPDI/T650/DMPA AN60

This comparison polymer was prepared in a manner similar to Polyurethane Ink Additive Example 2 except the HQEE diol was replaced with Terathane 650 and the DMPA was adjusted to obtain a polyurethane with an acid number of 60.

Comparative Additive Polymer 2 IPDI/T650/DMPA AN45

This comparison polymer was prepared in a manner similar to Polyurethane Ink Additive Example 1 except the HQEE diol was replaced with Terathane 650 and the DMPA was adjusted to obtain a polyurethane with an acid number of 45.

Self-Dispersed Black Pigment

The Self-Dispersed Pigment was prepared by methods described in previously referred to U.S. Pat. No. 6,852,156 Example 3.

Preparation of Inks with Polyurethane Ink Additives

Inks were prepared using the Polyurethane Ink Additives and Comparative Polymers by combining the components as described below. Percent refers to the active solids. All amounts shown are in weight percent.

Preparation and Testing of Inventive Inks 1 and 2.

The colorant was a carbon black, Nipex 160 which was dispersed with the Dispersant Polymer 1. Ink 1 had Polyurethane Ink Additive 1 and ink 2 had Polyurethane Ink Additive 2 and Comparative Ink 1 and no polymeric additive.

| | |
|---|---|
| colorant | 4% |
| Polymer additive | 2% |
| Pyrrolidone | 10% |
| Ethoxylated glycerol | 4% |
| Surfactants | 0.2% |
| Biocide | 0.25% |
| Water | Balance to 100% |

The inks were tested for stability by measuring the properties of the inks after they were made and then heating the inks to 70° C. and storing them at this temperature for 7 days. Then the key properties were measured again.

TABLE 1

Ink Example 1 and 2; Comparative Example 1; Properties

| | Ink 1 | Ink 2 | Comp Ink 1 |
|---|---|---|---|
| pH | 8.16 | 8.09 | 8.23 |
| Surface tension (mN/m) | 42.936 | 42.69 | 44.636 |
| Viscosity 25° C. (cp) | 3.26 | 3.26 | 2.8 |
| Conductivity (mS/cm) | 1.75 | 1.96 | 1.29 |
| D50, nm | 115.9 | 121.7 | 115.1 |
| D95, nm | 186.5 | 189.8 | 178.6 |
| After 7 days of storage at 70 C. | | | |
| pH | 7.82 | 7.87 | 7.91 |
| Surface tension (mN/m) | 42.56 | 43.36 | 43.157 |
| Viscosity 25° C. (cp) | 3.16 | 3.19 | 2.74 |

TABLE 1-continued

Ink Example 1 and 2; Comparative Example 1; Properties

|  | Ink 1 | Ink 2 | Comp Ink 1 |
|---|---|---|---|
| Conductivity (mS/cm) | 1.91 | 2.11 | 1.485 |
| D50, nm | 118.6 | 122.1 | 123.2 |
| D95, nm | 191 | 200.7 | 182.5 |

Inks 3-6 were prepared with the same formulation as the ink formulation for inks 1 and 2. The polyurethane ink examples 3, 4, 5, and 6 had the polyurethane ink additives 3, 4, 5, and 6 respectively. They were prepared and tested in a manner similar to inks 1 and 2. The colorant was a self-dispersed black pigment which was prepared as described above.

TABLE 2

Ink Example 3, 4, 5 and 6

|  | Ink 3 | Ink 4 | Ink 5 | Ink 6 |
|---|---|---|---|---|
| pH | 7.59 | 7.73 | 7.5 | 7.15 |
| Surface tension (mN/m) | 40 | 40.3 | 404 | 40.3 |
| Viscosity 25° C. (cp) | 2.66 | 2.76 | 3.27 | 2.64 |
| Conductivity (mS/cm) | 0.733 | 1.129 | 0.812 | 1.031 |
| D50, nm | 113 | 114 | 117 | 115 |
| D95, nm | 180 | 173 | 174 | 178 |
| After 7 days of storage at 70 C. | | | | |
| pH | 7.08 | 7.19 | 6.83 | 6.99 |
| Surface tension (mN/m) | 40 | 40.9 | 41 | 41.5 |
| Viscosity 25° C. (cp) | 2.46 | 2.54 | 2.8 | 2.54 |
| Conductivity (mS/cm) | 1.035 | 1.221 | 1.039 | 1.23 |
| D50, nm | 106 | 111 | 109 | 115 |
| D95, nm | 194 | 180 | 173 | 178 |

The inventive inks 1-6 are considered stable in this accelerated aging test.

Printing was done on a thermal inkjet printer DeskJet™ 6122 from Hewlett Packard (San Diego, Calif.) using the HP45A printhead in the black cartridge holder. The printing was done in the standard normal print mode selected by printer.

The optical density was measured using a Greytag-Macbeth SpectoEye™ instrument (Greytag-Macbeth AG, Regensdorf, Switzerland).

The durability of the image towards highlighter smear was done using a Faber-Castel highlighter pen after the printed image was allowed to dry for about an hour after printing. The image was marked once and twice with the highlighter. The amount of ink transfer into the unprinted area by the highlighter pen was noted by visual inspection and rated on a scale of 1 to 5 with 5 being best. The 5 rating has little if any smearing of the printed image with the highlighter.

Print data reported is reported in Table 3 with Inventive Inks 1 and 2 with comparative ink 1 listed are average of multiple measurements. For optical density and durability, the average was measured on three paper types: Hammermill™ Copy Plus (HCP), HP Multipurpose with ColorLok® (HPMP) and Xerox™ 4200 (4200). In all cases, higher values indicate higher level and better performance.

TABLE 3

Ink Example 1 and 2; Comparative Example 1; Print Results

|  | Paper | OD | highlighter tests 1x | highlighter tests 2x |
|---|---|---|---|---|
| Ink Example 1 | HCP | 1 | 5 | 4 |
| Ink Example 2 |  | 0.99 | 5 | 4 |
| Comp Ink Ex. 1 |  | 1.02 | 5 | 4 |
| Ink Example 1 | HPMP | 1.6 | 3 | 1.5 |
| Ink Example 2 |  | 1.58 | 3 | 1.5 |
| Comp Ink Ex. 1 |  | 1.52 | 2 | 1 |
| Ink Example 1 | X4200 | 1.01 | 5 | 4 |
| Ink Example 2 |  | 1.01 | 5 | 4 |
| Comp Ink Ex. 1 |  | 1.01 | 4.5 | 3 |

Ink Examples 1 and 2 show at least comparable optical density with better or comparable highlighter stability, when compared to an ink with no binder added.

Ink Examples 7 and 8, and Comparative Examples 2 and 3 were prepared using the ink formulation listed above with Polyurethane Ink Additives 1 and 2 respectively. Comparative Examples 2 and 3 have the same formulation but have Comparative Ink Additives 1 and 2 respectively. The colorant is a self-dispersed black pigment and its preparation is described above.

TABLE 4

Ink Example 7 and 8; Comparative Examples 2 and 3; Print Results

|  | Paper | OD | highlighter tests 1x | highlighter tests 2x |
|---|---|---|---|---|
| Ink Example 7 | HCP | 1.47 | 3.5 | 2.5 |
| Ink Example 8 |  | 1.46 | 3.0 | 2.0 |
| Comp Ink Ex. 2 |  | 1.40 | 3.5 | 2.0 |
| Comp Ink Ex. 3 |  | 1.40 | 4.5 | 3.0 |
| Ink Example 7 | HPMP | 1.57 | 2.5 | 1.5 |
| Ink Example 8 |  | 1.60 | 2.5 | 1.5 |
| Comp Ink Ex. 2 |  | 1.43 | 3.0 | 1.0 |
| Comp Ink Ex. 3 |  | 1.40 | 3.0 | 1.0 |
| Ink Example 7 | X4200 | 1.50 | 2.5 | 1.5 |
| Ink Example 8 |  | 1.51 | 2.5 | 1.5 |
| Comp Ink Ex. 2 |  | 1.43 | 3.0 | 1.0 |
| Comp Ink Ex. 3 |  | 1.41 | 4.0 | 1.5 |

The comparative ink additives are polyurethanes with polyether diols instead of the alkoxy aromatic diols. The alkoxy aromatic diols provide excellent optical density while retaining the durability as indicated by the highlighter tests.

Ink Examples 3 and 6 were printed and the OD and highlighter tests determined on the prints. The colorant is a self-dispersed black pigment as described above. Comparative Example 4 is the same formulation except no binder is the ink.

TABLE 5

Ink Example 3 and 6; Comparative Example 4; Print Results

|  | Paper | OD | highlighter tests 1x | highlighter tests 2x |
|---|---|---|---|---|
| Ink Example 3 | HCP | 1.43 | 3.5 | 2.5 |
| Ink Example 6 |  | 1.41 | 3.5 | 3 |
| Comp Ink Ex. 4 |  | 1.45 | 3 | 3 |
| Ink Example 5 | HPMP | 1.47 | 2 | 1 |

TABLE 5-continued

Ink Example 3 and 6; Comparative Example 4; Print Results

|  | Paper | OD | highlighter tests 1× | 2× |
|---|---|---|---|---|
| Ink Example 6 |  | 1.51 | 2 | 1 |
| Comp Ink Ex. 4 |  | 1.51 | 1.5 | 1 |
| Ink Example 5 | X4200 | 1.32 | 4 | 3 |
| Ink Example 6 |  | 1.42 | 3.5 | 3 |
| Comp Ink Ex. 4 |  | 1.5 | 2 | 1.5 |

In this polyurethane ink additive/colorant combination the optical densities are comparable to an ink with no binder added and the durability as indicated by the highlighter test is improved by the polyurethane ink additive derived from alkoxy aromatic diols.

Ink Examples 9-12 were prepared and tested. The polyurethane ink additives were 3, 4, 5, and 6 for inks 9, 10, 11, and 12 respectively. The Comparison Ink 5 is an equivalent formulation with no binder added. The colorant was a Nipex 160 with Dispersant Polymer 2.

TABLE 6

Ink Example 9, 10, 11 and 12; Comparative Example 5; Print Results

|  | Paper | OD | highlighter tests @ 10 minutes | Dry Smudge @ 10 minutes |
|---|---|---|---|---|
| Ink Example 9 | HPMP | 1.54 | 2 | 4 |
| Ink Example 10 |  | 1.37 | 2 | 4 |
| Ink Example 11 |  | 0.95 | 3 | 2 |
| Ink Example 12 |  | 1.51 | 2 | 4 |
| Comp Ink Ex. 5 |  | 1.51 | 2 | 3 |
| Ink Example 9 | X4200 | 1.02 | 5 | 5 |
| Ink Example 10 |  | 0.96 | 3 | 4 |
| Ink Example 11 |  | 0.86 | 5 | 4 |
| Ink Example 12 |  | 0.95 | 4 | 4 |
| Comp Ink Ex. 5 |  | 1.05 | 2 | 3 |

Dry smudge is a test in which the print is allowed to dry for the indicated time and the print tested for smudge resistance; a higher number is better. The Inventive Ink examples are comparable to better than the comparable inks. Ink Example 11 may have produced poorer results than expected because of unknown reasons.

The invention claimed is:

1. An aqueous inkjet ink composition comprising:
   (a) a colorant;
   (b) an aqueous vehicle; and
   (c) a first polyurethane additive comprising an alkoxy aromatic diol, a diol substituted with an ionic group, and isocyanates
   wherein the alkoxy aromatic diol is $Z_1$

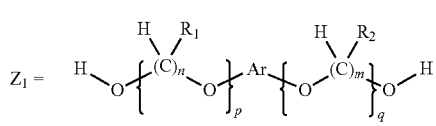

wherein Ar is an aromatic group,
   n, m, p, and q are integers,
   n, m are the same or different and are greater than or equal to 2 to 12,
   p is greater than or equal to 1 to 15,
   q is greater than or equal to 0 to 15,
   $R_1$, $R_2$ are the same or different and each is independently selected from the group consisting of hydrogen, methyl, ethyl and higher alkyls of the formula of $C_tH_{2t+1}$;
   where t is an integer and is greater than or equal to 3 to 36,
   $Z_2$ is a diol substituted with an ionic group; and
   at least one $Z_1$ and at least one $Z_2$ must be present in the first polyurethane additive.

2. The aqueous inkjet ink composition of claim 1, wherein the polyurethane additive is from 0.05 to 10%, by weight based on the weight of the total ink composition.

3. The aqueous inkjet ink composition of claim 1, wherein the polyurethane additive is from 0.2 to 7% by weight based on the weight of the total ink composition.

4. The aqueous inkjet ink composition of claim 1, having from 0.1 to 10 wt % colorant based on the total weight of the ink, a surface tension in the range of 20 dyne/cm to 70 dyne/cm at 25° C., and a viscosity of lower than 30 cP at 25° C.

5. The aqueous inkjet ink composition of claim 1, wherein the polyurethane additive has an acid number (mg KOH per gram solid polymer) of at least 10 and at most 100.

6. An aqueous inkjet ink composition of claim 1 wherein for the alkoxy aromatic diol $Z_1$ p is selected from the group consisting of 1, 2, 3 and 4 and q is selected from the group consisting of 1, 2, 3 and 4.

7. The aqueous inkjet ink composition of claim 1 wherein the aromatic group is a hydroquinone.

8. The aqueous inkjet ink composition of claim 1 wherein the aromatic group is a bisphenol.

9. The aqueous inkjet ink composition of claim 1, wherein the colorant is a selected from pigments and dispersed dyes.

10. An aqueous inkjet ink composition of claim 1, wherein the colorant is a self-dispersed pigment.

11. The ink of claim 10, wherein the anionic hydrophilic chemical groups on the self-dispersed carbon black pigment comprise carboxyl groups.

12. An aqueous inkjet ink composition of claim 10, wherein the self-dispersed pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment.

13. The aqueous inkjet ink composition of claim 10 wherein the self-dispersed pigment comprises a pigment that has been oxidatively treated on its surface with ozone.

14. The aqueous inkjet ink composition of claim 1, wherein the aqueous vehicle is a mixture of water and at least one water-miscible solvent.

15. A method of inkjet printing onto a substrate is provided comprising, in any workable order, the steps of:
   providing an inkjet printer that is responsive to digital data signals;
   (a) loading the printer with a substrate to be printed;
   (b) loading the printer with the aqueous inkjet ink composition of claim 1;
   (c) printing onto the substrate using the aqueous inkjet ink, in response to the digital data signals to form a printed image on the substrate.

16. An inkjet ink set wherein at least one of the inks in the inkjet ink set is an aqueous inkjet ink composition comprising
   (a) a colorant;
   (b) an aqueous vehicle; and (c) a polyurethane first additive comprising an alkoxy aromatic diol, a diol substituted with an ionic group, and isocyanates
wherein the alkoxy aromatic diol is $Z_1$

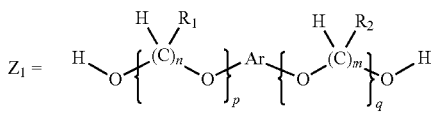

I wherein Ar is an aromatic group,
n, m, p, and q are integers,
n, m are the same or different and are greater than or equal to 2 to 12,
p is greater than or equal to 1 to 15,
q is greater than or equal to 0 to 15,
$R_1$, $R_2$ are the same or different and each is independently selected from the group consisting of hydrogen, methyl, ethyl and higher alkyls of the formula of $C_tH_{2t+1}$;
where t is an integer and is greater than or equal to 3 to 36,
$Z_2$ is a diol substituted with an ionic group; and
at least one $Z_1$ and at least one $Z_2$ must be present in the first polyurethane additive.

17. A method of inkjet printing onto a substrate is provided comprising, in any workable order, the steps of:
   a. providing an inkjet printer that is responsive to digital data signals;
   b. loading the printer with a substrate to be printed;
   c. loading the printer with the aqueous inkjet ink set of claim 16;
   d. printing onto the substrate using the aqueous inkjet ink set, in response to the digital data signals to form a printed image on the substrate.

18. An aqueous inkjet ink composition comprising
   (a) a colorant;
   (b) an aqueous vehicle; and
   (c) a second polyurethane additive comprising an alkoxy aromatic diol, a diol substituted with an ionic group, and isocyanates
wherein the alkoxy aromatic diol is $Z_1$

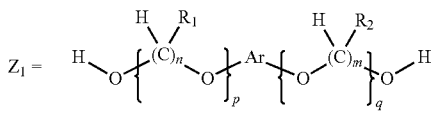

I wherein Ar is an aromatic group,
n, m, p, and q are integers,
n, m are the same or different and are greater than or equal to 2 to 12,
p is greater than or equal to 1 to 15,
q is greater than or equal to 0 to 15,
$R_1$, $R_2$ are the same or different and each is independently selected from the group consisting of hydrogen, methyl, ethyl and higher alkyls of the formula of $C_tH_{2t+1}$;
where t is an integer and is greater than or equal to 3 to 36;
and wherein the second polyurethane additive has the structure II,

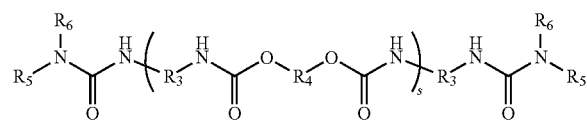

II $R_3$ is alkyl, substituted alkyl, substituted alkyl/aryl from diisocyanate,
$R_4$ is $Z_1$ or $Z_2$,
$R_5$ is hydrogen; alkyl; branched alkyl or substituted alkyl from the amine terminating group,
$R_6$ is alkyl, branched alkyl or substituted alkyl from the amine terminating group,
s is an integer greater than or equal to 2 to 30;
$Z_1$ or $Z_2$ are defined above as the alkoxy aromatic diol and $Z_2$ as the diol substituted with an ionic group.

19. The aqueous inkjet ink composition of claim 18, having from 0.05 to 10 wt % second polyurethane additive based on the total weight of the ink, having from 0.1 to 10 wt % colorant based on the total weight of the ink, a surface tension in the range of 20 dyne/cm to 70 dyne/cm at 25° C., and a viscosity of lower than 30 cP at 25° C.

20. An aqueous inkjet ink composition of claim 18 wherein for the alkoxy aromatic diol $Z_1$ p is selected from the group consisting of 1, 2, 3 and 4 and q is selected from the group consisting of 1, 2, 3 and 4.

21. An aqueous inkjet ink composition of claim 18, wherein the colorant is a selected from pigments and dispersed dyes.

22. An aqueous inkjet ink composition of claim 18, wherein the colorant is a self-dispersed pigment.

23. The ink of claim 22, wherein the anionic hydrophilic chemical groups on the self-dispersed carbon black pigment comprise carboxyl groups.

24. An aqueous inkjet ink composition of claim 22, wherein the self-dispersed pigment comprises a pigment that has been oxidatively treated on its surface with hypochlorous acid, sulfonic acid, or ozone so as to bond at least one functional group selected from the group consisting of carbonyl, carboxyl, hydroxyl and sulfone, onto the surface of the pigment.

* * * * *